Patented Dec. 22, 1942

2,305,940

UNITED STATES PATENT OFFICE 2,305,940

SPRAY DRYING PROCESS

James F. Walsh, Tuckahoe, N. Y., assignor to American Maize-Products Company, a corporation of Maine No Drawing. Application September 21, 1939, Serial No. 295,908

3 Claims. (Cl. 99—141)

This invention relates to a spray dried composition and process of manufacture and more particularly to a substantially non-hygroscopic nutritious edible spray-dried powdery material adapted to be used in the baking, brewing and confectionery industries. The composition comprises essentially an intimate mixture of solidified starch conversion syrup and water soluble non-coagulable proteins derived from natural starchy substances and freed of impurities and with or without the addition of diastase; the product being prepared preferably in such a manner as to prevent material discoloration, or damage to the diastase.

Starch conversion syrups alone, such as corn syrup obtained by acid conversion of starch, have been spray dried before to produce a solid product but difficulties have been encountered in producing the packaging the spray dried material because of its strong hygroscopic tendencies. Also, the product does not contain the proteins which are very desirable and essential in certain food products. In accordance with the present invention these difficulties and deficiencies are overcome. By this invention it has been found that if the starch conversion syrup is treated with a solution of soluble proteins to provide an intimate mixture (or when desired a heat reacted compound) and this resulting substance is spray dried under controlled temperature conditions, the proteins and syrup solids will coact or react to form a new spray dried product which is substantially non-hygroscopic and possesses the desired nutritious and other properties. The coaction or reaction of the constituents and accordingly the characteristic properties of the final product are controlled largely by the temperature conditions during spray drying.

The components of the composition of this invention are incorporated to form a substantially homogeneous mixture which is subsequently subjected to spray-drying or aeroform drying where the temperature is controlled by a high rate of evaporation from large surface areas presented to the drying medium. The finished product is soluble in water, substantially non-hygroscopic, and is free of discoloration when the drying is carried out at low temperatures. The product contains readily assimilable carbohydrates, nutrient salts, (e. g. phosphates, phytins, lactates) and proteins such as albumens and amino acids; and is diastatically active when a diastase is used.

The starch conversion syrup component of the composition may be obtained by acid or enzyme conversion of starch from any suitable source such as corn, wheat, rice, peas, beans, potatoes. The syrup in the usual case should contain a reducing sugars content (calculated as anhydrous dextrose) of about 25% to 65%. The syrup contains dextrose, maltose and dextrins in varying amounts depending upon the degree of conversion. Each of these constituents provide desirable properties in the final composition. The reducing sugars maltose and dextrose are utilized as fermentation agents for bakery and brewing products and as sugars in the confectionery products. The dextrins, which are edible, supply assimilable carbohydrates. A common and advantageous form of starch conversion syrup is corn syrup or commercial glucose obtained by conversion of corn-starch with acid, heat and pressure in conventional manner, and containing about 40% to 42% reducing sugars.

The water soluble proteins may be obtained from the above mentioned natural starchy substances such as corn, wheat, rice, etc., or modified products thereof. The preferred source of these materials is corn steep water that has been treated to move the undesirable substances particularly the heat coagulable solids and other non-assimilable substances. The steep water contains a substantial amount of soluble ingredients of the corn particularly soluble proteins and certain salts, such as phosphates and phytins, that have nutritive value and are desirable in food products. The steep water may be that obtained in the convention manufacture of corn starch by soaking or steeping the corn in sulphurous acid solution. In addition to the desirable soluble ingredients of the corn particularly soluble proteins, the steep water also contains some undesirable substances such as the heat coagulable proteins and other non-assimilable substances.

A process for treating steep water to remove the undesirable solids and preserve the desirable proteins and other soluble materials is disclosed in the copending application of Stein, Walsh and Needle, Serial No. 131,366, filed March 17, 1937. The process comprises principally neutralization of the steep water with an alkaline material, e. g. lime, to a pH of about 6 to 7, which effects coagulation of the undesired solids, and filtering to remove the coagulated solids.

The filtered steep water contains about 6.9% total solids; ash (mineral substances 0.88% and soluble protein content of 3.4% and has a Baumé of about 5° to 6°. It has a taste and flavor satisfactory for use in the final composition; whereas the steep water containing the original non-soluble proteins and other solids would be entirely unsuitable. If desired the steep water may be concentrated before or after neutralization. The amount of proteins in the final product is controlled by the amount of filtered steep water used. These proteins are useful as a yeast food and provide a nutritious component in the composition.

The diastase material which may be used in this composition where a diastatically active product is desired, may be diastatic malt extract, diastase concentrates and other suitable enzymes.

A commercial form and source of this enzymatic material is takadiastase. The amount and type of enzyme added to the liquid composition will determine the diastatic content of the final spray dried product.

The composition of this invention may be prepared in several different ways and the characteristic features of the final spray dried composition will vary with the different procedures, as indicated by the following. The starch conversion syrup and solution of soluble proteins from natural starchy materials, for example refined steep water, may be intimately admixed and a very slight amount of heat employed just sufficient to condition the mixture for spray drying but insufficient to cause any decomposition or discoloration of the ingredients or establishment of flavor due to heating. Such a mixture would then be spray dried at relatively low temperatures sufficient to effect dehydration and coaction between the proteins and syrup solids but insufficient to cause any of the above mentioned undesired changes. The resulting spray dried product is a substantially non-hygroscopic, colorless, free flowing powdery material. This product has a bland, cereal-like taste and because of this and its freedom from color it is particularly useful in white bakery and confectionery products, which prohibit any introduction of marked color or flavor. It is also adapted for use in ice cream where added color and marked flavor are not permitted.

To prepare a product having substantial diastatic activity but still substantially free of added flavor or color, the low temperature procedure outlined above would be followed and there would be incorporated in the mixture prepared for spray drying a suitable amount of one of the above mentioned enzymes. The temperature of the composition during compounding and also during the spray drying is maintained below the temperature at which the diastase would be damaged. Usually this temperature is below about 150° F. Prior to spray drying the pH of the composition is adjusted to the proper value to give optimum diastatic activity. This usually falls within the range of about 4.5 pH to 6.5 pH. The diastatically active and substantially colorless and tasteless product resulting from this procedure is particularly useful in fermentation products wherein the diastase would facilitate fermentation and the proteins, carbohydrates and sugars would provide the nutritious elements.

In products where added flavor and color are not prohibited and particularly where they are desired, the composition of our invention will be heated sufficiently to cause a definite color and flavor producing reaction to take place between the starch conversion syrup and the refined steep water or other water soluble proteins. This heat reaction may be brought about either before the composition is spray dried; or the reaction may be caused to take place during the spray drying operation, or the spray-dried material may be heated in the dry form to effect this reaction. The dehydrating atmosphere, usually heated air, into which the composition is sprayed or atomized may be heated to a relatively high temperature that will raise the temperature of the sprayed material in suspension to about 150° F. to 200° F. At such temperature the product will darken somewhat and develop a strong cereal flavor and odor and produce reaction products of the proteins, sugars and dextrins. This product may be used as a brewing or baking adjunct where its color and flavor would augment and improve the material color and flavor of the product to which it is added, while the sugar component of the spray dried product would assist in fermentation and the proteins and carbohydrates would advantageously increase the nutrient solids content of the product. If desired a dried diastase concentrate may be blended with this heat reacted spray dried material to make it diastatically active.

Where it is desired to augment the aroma and flavor of the above described heat-reacted product it may be heated again after spray drying; that is, the solid dried material may be heated to produce the flavor and aroma. This will also apply to the low temperature coacted, spray dried product where it is desired to convert it into a product having marked flavor and aroma. The temperatures normally used for this purpose will be about 150° F. to 200° F., and preferably cooling the heated product rapidly to arrest reaction and facilitate any further necessary processing such as grinding and packaging.

The following illustrative but non-limiting example shows the preparation of one of the above described forms of my composition, which is substantially colorless and has a bland taste. Partially concentrated steep water containing about 10% to 15% solids including a substantial amount of undesirable insoluble salts and proteins, is neutralized with lime to a pH of about 6.4 to 6.6 and the insoluble substances removed by filtration. The filtrate which is a substantially clear liquid is next admixed with corn syrup of about 30° to 35° Baumé which has been substantially completely refined and free of coloring matters. Simultaneously with or subsequent to this mixing, diastase "S" is added and the ingredients thoroughly mixed.

The ingredients are mixed in proportions preferably to give the mixture about 50% solids. This may range however between about 35% and 55% solids, preferably as high as practical to spray. Normally this involves proportions of about 1 to 3 parts of the corn syrup liquor to one-half to two parts of the refined steep water; the variations in proportions depending upon the desired protein and salt content in the finished dried product.

In preparing the above refined steep water, corn syrup and diastase mixture, no heating for concentration is used but only that required to effect thorough mixing. Likewise, in the preparation of the steep water the temperature is raised only to that required for the specified concentration. More specifically, the heating is minimized to prevent reaction of the proteins, salts and carbohydrates which would cause strong flavor formation, discoloration and destruction of the diastase.

For producing the desired dried, comminuted solid product from the mixture described just above, the mixture is heated to a temperature not exceeding about 125° F. and sprayed into a desiccator containing heated air which effects dehydration of the sprayed material, but does not heat the material above about 125° F. This relatively low temperature treatment during spray drying causes the steep water proteins and corn syrup solids to coact to produce the non-hygroscopic and other desirable properties, mentioned above, in the final product. The spray-dried material is dehydrated down to a moisture content of about 3% or less. It is in the form of small, generally spherical or rounded discrete particles which are free flowing and satisfactorily stable against hygroscopic tendencies. This product is substantially colorless and has a very slight cereal-like flavor. This is in contrast to the malt-like flavored and dark products that would be produced by the high temperature-treatments discussed above.

A typical example of the product resulting from spray drying a mixture of the kind described above has the following composition:

| | Per cent |
|---|---|
| Proteins | 4.5 |
| Reducing sugars | 43.0 |
| Ash | 1.4 |
| Other components, principally dextrins | 48.1 |
| Moisture | 3.0 |
| | 100.0 |

The diastatic activity of the spray dried products of this invention may be varied from about 20° to 150° Lintner value by varying the amount and kind of diastase used. When using malt extract as the diastase material the diastatic activity of the finished product will range generally between about 20° to 40° Lintner value, and when using the diastase concentrate the diastatic activity will range generally from about 40° to 150° Lintner value. The term Lintner value, as used herein to express diastatic activity, is defined in and is determined by the method described in the American Handy Book of the Brewing, Malting and Auxiliary Trades, third edition volume I.

To minimize further any hygroscopic tendencies and to increase the nutritive properties of the spray dried material it may be dry compounded with certain other edible materials, such as, soya-flour, starch, and partially gelatinized starch and protein materials.

The spray-dried products of this invention are particularly characterized by their high assimilability, nutritive character, desirable taste and freedom from undesirable color. They contain a high concentration of the desirable soluble proteins, salts, sugars and carbohydrates and are markedly free of the objectionable insoluble proteins and heat coagulable substances. The soluble proteins supply adequate amounts of assimilable nitrogen to maintain maximum micro-organism action when the composition is used as a bread conditioner. The phosphates catalyze the micro-organism action by combining with the hexose sugars and make them more labile for the micro-organism action; while the mineral salts stimulate the organisms without forming any chemical combinations with reacting substances. The reducing sugars are utilized particularly in fermentation, and the diastase acts to convert the starch, in a bakery product for example, to render it assimilable in fermentation.

What is claimed is:

1. A method of making a substantially dry, non-hygroscopic, free-flowing nutritive composition comprising a coacted product of a starch conversion syrup having a reducing sugars content of between about 25% and 65% calculated as dextrose and soluble proteins, which method comprises intimately mixing such a starch conversion syrup with a separately concentrated solution of soluble, substantially non-coagulable proteins of corn steep water, adjusting the pH to about 4.5 to 6.5, heating the mixture to a temperature ranging from about 125° up to less than 150° F. to condition the mixture for spray-drying but without developing any dark color therein and without effecting substantial further concentration, and when spray-drying the mixture at a temperature not in excess of 150° F. to a moisture content not substantially above 3%.

2. A process as specified in claim 1 in which the material is not heated to a temperature substantially in excess of 125° F. until dried.

3. A method as specified in claim 1 in which the materials treated are corn syrup and the non-coagulable corn steep water proteins.

JAMES F. WALSH.